United States Patent
Wallters et al.

(10) Patent No.: US 10,171,853 B2
(45) Date of Patent: *Jan. 1, 2019

(54) SYSTEMS AND METHODS FOR MANAGING AVAILABLE BANDWIDTH IN A HOUSEHOLD

(71) Applicant: Rovi Guides, Inc., San Carlos, CA (US)

(72) Inventors: Claire M. Wallters, Saratoga, CA (US); Lauren Palmateer, San Francisco, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,580

(22) Filed: Sep. 18, 2017

(65) Prior Publication Data
US 2018/0027270 A1    Jan. 25, 2018

Related U.S. Application Data

(63) Continuation of application No. 14/955,345, filed on Dec. 1, 2015, now Pat. No. 9,800,907.

(51) Int. Cl.
*H04N 21/24* (2011.01)
*H04N 21/2385* (2011.01)
(Continued)

(52) U.S. Cl.
CPC ..... *H04N 21/2402* (2013.01); *H04L 43/0894* (2013.01); *H04L 65/00* (2013.01);
(Continued)

(58) Field of Classification Search
CPC .......... H04N 21/2402; H04N 21/2385; H04N 21/43615; H04N 21/4402;
(Continued)

(56) References Cited

U.S. PATENT DOCUMENTS 8,631,452 B2 *   1/2014   Xu .................... H04N 7/17318
                                                              375/240.27
8,713,607 B2 *   4/2014   McEnroe ............... H04N 7/163
                                                              725/41
(Continued)

*Primary Examiner* — Benjamin R Bruckart
*Assistant Examiner* — Jen-Shi Huang
(74) *Attorney, Agent, or Firm* — Haley Guiliano LLP

(57) ABSTRACT

Systems and methods for managing available bandwidth in a household are provided. A request to access a first media asset is received. A determination is made as to whether a bandwidth currently available in the household is sufficient for enabling access to the first media asset. When the bandwidth currently available in the household is insufficient for enabling access to the first media asset, a search is performed for a second media asset currently consuming a portion of the household bandwidth needed for enabling access to the first media asset. A third media asset is identified having a remaining duration that is more than a remaining duration of the second media asset. A message is displayed that indicates the bandwidth currently available in the household is insufficient to access the first media asset and that has an option to access the third media asset instead of the first media asset.

20 Claims, 11 Drawing Sheets

(51) Int. Cl.
*H04N 21/234* (2011.01)
*H04N 21/647* (2011.01)
*H04N 21/442* (2011.01)
*H04N 21/4402* (2011.01)
*H04N 21/436* (2011.01)
*H04L 12/26* (2006.01)
*H04L 29/06* (2006.01)

(52) U.S. Cl.
CPC ... *H04N 21/2385* (2013.01); *H04N 21/23406* (2013.01); *H04N 21/43615* (2013.01); *H04N 21/4402* (2013.01); *H04N 21/44209* (2013.01); *H04N 21/44227* (2013.01); *H04N 21/64738* (2013.01); *H04N 21/64792* (2013.01)

(58) Field of Classification Search
CPC ......... H04N 21/64738; H04N 21/4583; H04N 21/47214; H04N 21/4882; H04N 21/44209; H04N 21/26216; H04N 21/26241; H04N 21/44227; H04N 21/47202
See application file for complete search history.

(56) References Cited

U.S. PATENT DOCUMENTS

| | | | |
|---|---|---|---|
| 8,904,445 B2* | 12/2014 | Britt | H04N 5/782 725/46 |
| 9,270,944 B2* | 2/2016 | Brooks | H04N 7/17318 |
| 9,800,907 B2* | 10/2017 | Wallters | H04N 21/2402 |
| 2008/0192820 A1* | 8/2008 | Brooks | H04N 7/17318 375/240.02 |
| 2012/0084826 A1* | 4/2012 | Xu | H04N 7/17318 725/109 |

* cited by examiner

800

810 — Begin Process for Retrieving, from Stored Metadata Associated with the First Media Asset, a Minimum Bandwidth Value for Accessing the First Media Asset 820 — Generate Query for a Media Listings Database that Includes an Identifier of the First Media Asset 830 — Transmit Generated Query to the Media Listings Database 840 — Receive Data Structure from the Media Listings Database that Includes Multiple Fields of Information for the First Media Asset 850 — Identify One of the Multiple Fields that Represents Minimum Access Bandwidth 860 — Retrieve Data Indicating the Minimum Access Bandwidth from the Identified Field of the Received Data Structure 870 — Store as the Minimum Bandwidth Value the Retrieved Data Indicating the Minimum Access Bandwidth in Memory

FIG. 8

SYSTEMS AND METHODS FOR MANAGING AVAILABLE BANDWIDTH IN A HOUSEHOLD

CROSS-REFERENCE TO RELATED APPLICATION

This application is a continuation of U.S. patent application Ser. No. 14/955,345, filed Dec. 1, 2015, now allowed, which is hereby incorporated by reference herein in its entirety.

BACKGROUND

In conventional systems, users have access to a plethora of media content. However, access to the media content is limited by the available household bandwidth of the user. Users often encounter situations where access to requested content is restricted or severely degraded because the available household bandwidth for accessing the requested content is insufficient. This typically occurs when one user in the household is accessing content that consumes most of the available bandwidth, which prevents other users from accessing other content. Conventional systems leave users frustrated in these situations as the user is unable to access the requested content and the systems fail to provide alternate content-viewing plans to the user.

SUMMARY

Accordingly, methods and systems are disclosed herein for managing available bandwidth in a household. In some embodiments, a user may request to access a media asset that needs to consume more bandwidth than is currently available in the household. As a result, the system may identify another media asset that is currently consuming a portion of the household bandwidth. Specifically, the system may identify another media asset that is consuming a portion of the household bandwidth that is needed by the requested media asset. The system may determine how long it will be until the media asset currently consuming the bandwidth ends, at which point the household bandwidth portion needed by the requested media asset will be freed up. Based on this length of time, the system may recommend to the requesting user an alternate media asset to consume from another source (e.g., broadcast or equivalent music or news service that is not interfering with bandwidth usage) while waiting for the media asset currently consuming the bandwidth to end. In some implementations, the alternate media asset may be selected based on how much time remains in the alternate media asset relative to how much time until the media asset currently consuming the household bandwidth ends. In other cases, the use of an Internet-related alternative that is associated with minimal bandwidth consumption such as a music or still news images from the Internet can be provided.

In some embodiments, a request to access a first media asset is received from a user device. A minimum bandwidth value for accessing the first media asset is retrieved from stored metadata associated with the first media asset. The minimum bandwidth value is compared to a household bandwidth value. The household bandwidth value indicates a bandwidth currently available in the household. In response to determining that the minimum bandwidth value is greater than the currently available household bandwidth value, bandwidth consumption values stored in a bandwidth consumption field of a household bandwidth state database are searched to identify a second media asset, being accessed in the currently available household, that is associated with a bandwidth consumption value that exceeds a difference between the minimum bandwidth value and the household bandwidth value. A determination is made of a time remaining for completing access to the second media asset. Duration values stored in a duration field of a media asset database are searched to identify a third media asset associated with a duration value that is more than the time remaining. A message that indicates the bandwidth currently available in the household is insufficient to access the first media asset and that has an option to access the third media asset instead of the first media asset is generated for display on the user device.

In some implementations, a user selection of a quality associated with the first media asset is received. The stored metadata is processed to identify the minimum bandwidth value that is associated with the selected quality.

In some implementations, an initial value for the household bandwidth value is stored in the household bandwidth state database. A request to access the second media asset is received before receiving the request to access the first media asset. A minimum bandwidth value for accessing the second media asset is retrieved from stored metadata associated with the second media asset. The minimum bandwidth value for accessing the second media asset is stored in the bandwidth consumption field of the household bandwidth state database associated with the second media asset. The initial value for the household bandwidth value is decremented by the minimum bandwidth value for accessing the second media asset.

In some embodiments, the bandwidth available in the household is associated with a first network. In some implementations, the message includes at least one of an option to access the first media asset from a second network and an option to access email.

In some embodiments, the time remaining is determined by retrieving from the household bandwidth state database a current play position of the second media asset. A difference between a duration of the second media asset and the current play position is computed to determine the time remaining.

In some implementations, the second media asset is provided by an on-demand content source and the third media asset is provided by a broadcast content source.

In some implementations, the message includes an option to terminate access to the second media asset in order to enable access to the first media asset. In some implementations, the duration value of the third media asset represents how much time remains in the third media asset.

In some embodiments, searching the duration values includes identifying an attribute of the first media asset. Attributes stored in an attribute field of the media asset database are searched to identify a list of media assets associated with an attribute corresponding to the identified attribute of the first media asset. The duration values stored in the media asset database are searched for the list of media assets.

In some embodiments, a request to access a first media asset is received. A determination is made as to whether a bandwidth currently available in the household is sufficient for enabling access to the first media asset. When the bandwidth currently available in the household is insufficient for enabling access to the first media asset, a search is performed for a second media asset currently consuming a portion of the household bandwidth needed for enabling access to the first media asset. A third media asset is identified having a remaining duration that is more than a remaining duration of the second media asset. A message is displayed that indicates the bandwidth currently available in the household is insufficient to access the first media asset and that has an option to access the third media asset instead of the first media asset. In some embodiments, the message includes an option to enable shared access to the second media asset.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 6-12 are flow diagrams of an illustrative process for managing available bandwidth in a household in accordance with some embodiments of the disclosure.

DETAILED DESCRIPTION OF DRAWINGS

Figure 1:
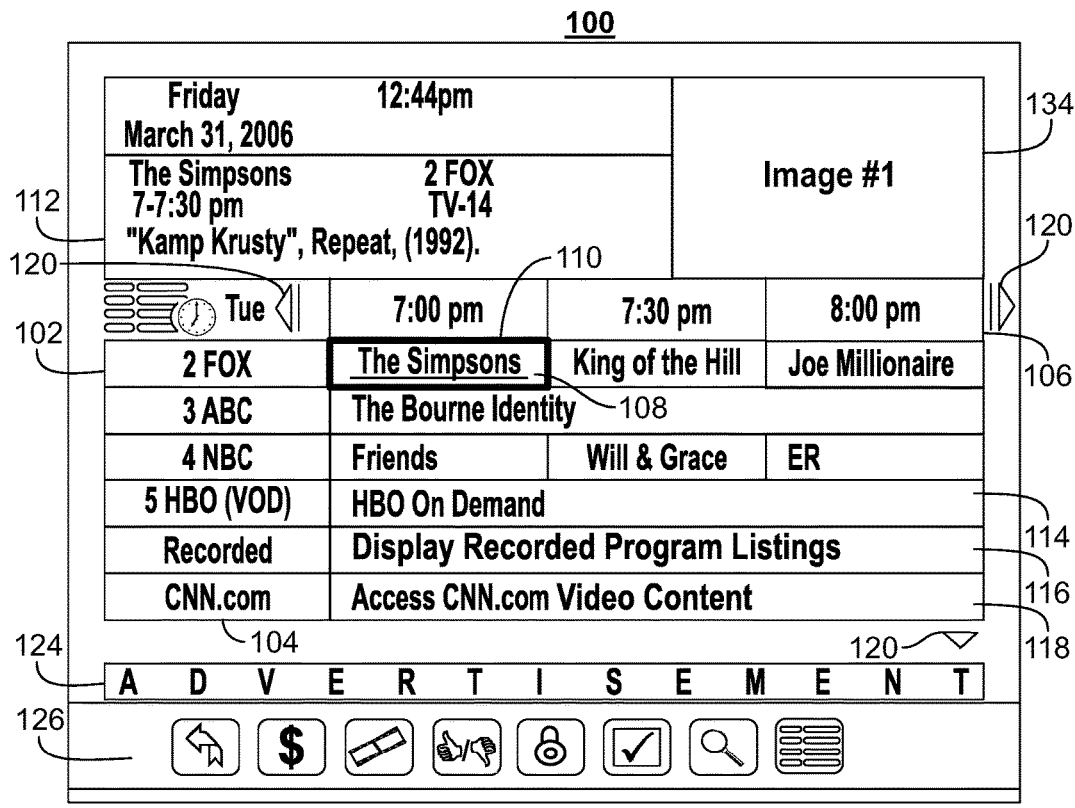
FIGS. 1 and 2 show illustrative display screens that may be used to provide media guidance application listings in accordance with an embodiment of the disclosure.

Methods and systems are disclosed herein for managing available bandwidth in a household. In some embodiments, a media guidance application may receive a user request to access a first media asset from one or more users in a household. Families or users often have user equipment devices (e.g., set-top boxes) placed throughout the household. A family's or user's household may even include multiple homes. As referred to herein, the term "household" should be understood to mean a home or homes associated with a user.

The media guidance application may determine the available bandwidth in the household needed to access the first media asset. The media guidance application may determine that the bandwidth currently available in the household is insufficient for enabling access to the first media asset. In response, the media guidance application may search for a second media asset currently consuming a portion of the household bandwidth that is needed for enabling access to the first media asset. The media guidance application determines how much time remains for accessing the second media asset and may identify a third media asset having a remaining duration that is more than the time remaining for accessing the second media asset. The media guidance application may display a message, to the user who requested access to the first media asset, which indicates the bandwidth currently available in the household is insufficient to access the first media asset and that has an option to access the third media asset instead of the first media asset.

With reference to media assets or content, the amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media or medium capable of storing data. The computer-readable media or medium may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, server based storage (e.g., cloud storage), Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wired or wireless device, and/or combination of the same. In some embodiments, the user equipment device may have a front facing screen and a rear facing screen, multiple front screens, smart watch, automobile screen, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, data used for generating metadata associated with media assets, a household bandwidth state database, a media asset database, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), subtitles, media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. The static reading material stored, for example, on an e-book reader (e.g., a Nook), maybe stored in the smart television or comparable device and loaded upon request from the user such that the static reading material delay the video watching until the bandwidth is freed up.

Figure 2:
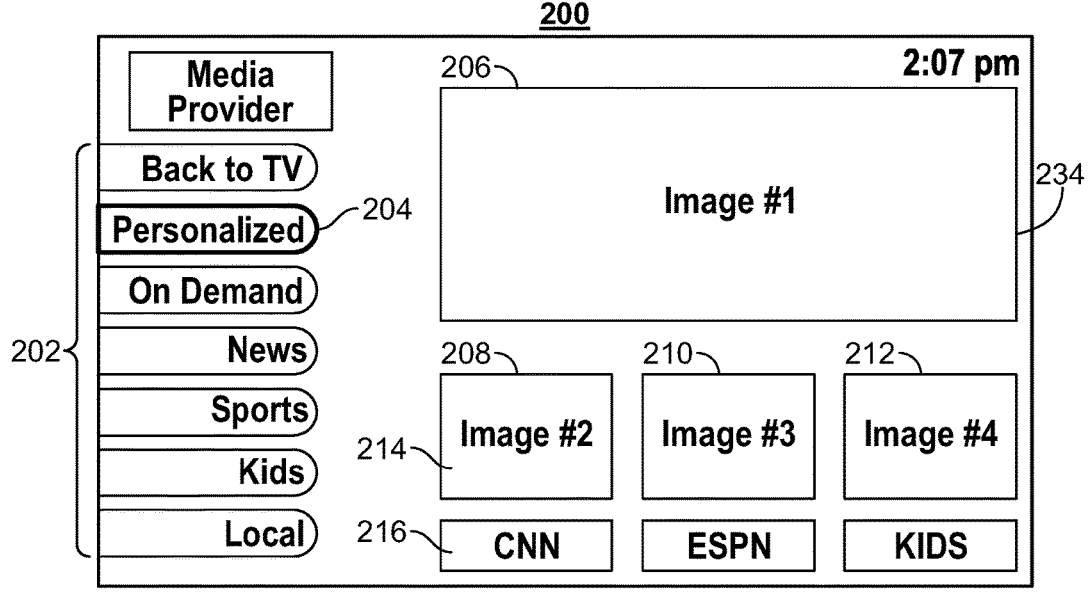
Figure 5:
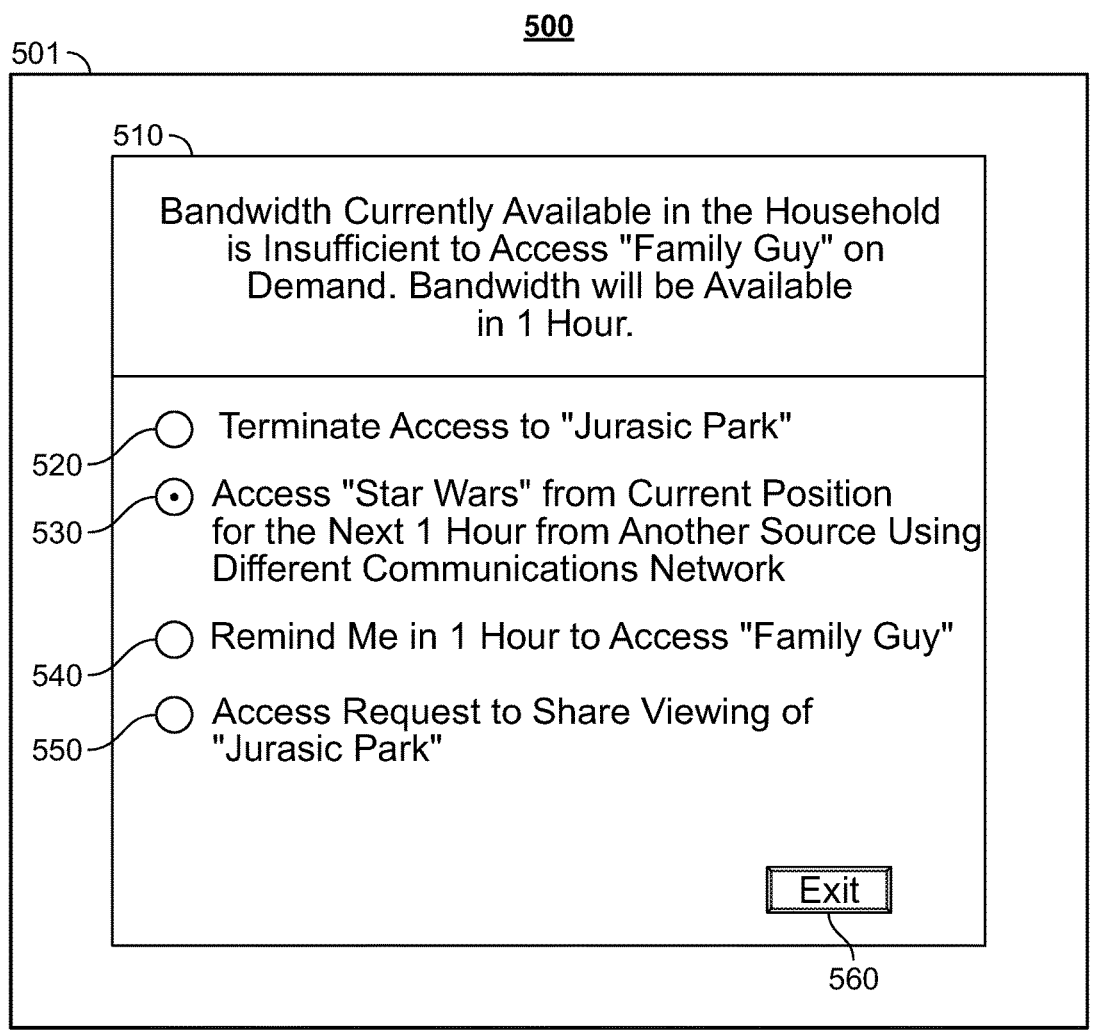
FIG. 5 shows an illustrative display screen that may be used to manage available bandwidth in a household in accordance with some embodiments of the disclosure.

FIGS. 1 and 2 show illustrative display screens that may be used to provide media guidance data. The display screens shown in FIGS. 1-2 and 5 may be implemented on any suitable user equipment device or platform. While the displays of FIGS. 1-2 and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc. or voice command) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria such as recorded content that may not take any of the available bandwidth.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

In some embodiments, the media guidance application may receive a user selection of a first on-demand media asset (e.g., for access from a first communications network such as a cable on-demand communications network). For example, the media guidance application may receive a user selection of a program listing displayed in grid 102 corresponding to the first on-demand media asset. The media guidance application may retrieve metadata associated with the first on-demand media asset to identify a minimum bandwidth consumption value of the selected first on-demand media asset. In some implementations, the first on-demand media asset may be associated with multiple versions (e.g., the first media asset may be available in high-definition (HD) or standard definition (SD)). In some implementations, the HD version of the first media asset may be associated with a higher minimum bandwidth consumption value than the SD version of the first media asset.

As defined herein, the phrase "household bandwidth" means the amount of data that can be communicated to one or more users in the household over a given period of time via a given communications network. For example, household bandwidth may represent how much data one or more users can receive or send per second through an on-demand cable communications network.

The media guidance application may query a household bandwidth state database to determine the current state of the household bandwidth. It should be understood that in the context of the present disclosure, the household bandwidth state database maintains the household bandwidth state for a particular communications network (e.g., a cable on-demand network). In other implementations, bandwidth state may be stored in the same or a different database for one or more other communications networks. Specifically, the media guidance application may determine how much bandwidth is currently available in the household for accessing media content. The media guidance application may compare the currently available household bandwidth to the minimum bandwidth value associated with the selected first on-demand media asset. If the available household bandwidth is greater than the minimum bandwidth value associated with the selected first on-demand media asset, the media guidance application may access the first on-demand media asset and display the media asset to the requesting user. If the available household bandwidth is less than the minimum bandwidth value associated with the selected first on-demand media asset, the media guidance application may query the household bandwidth state database to identify a second on-demand media asset that is consuming the household bandwidth.

The media guidance application may determine whether the bandwidth consumed by the second on-demand media asset is greater than a difference between the minimum bandwidth value associated with the first media asset and the currently available household bandwidth. Specifically, the media guidance application may determine whether the second media asset is consuming an amount of bandwidth that is missing from the currently available household bandwidth to enable access to the first media asset.

The media guidance application may determine when access to the second on-demand media asset will end, at which point access to the first on-demand media asset will be available. The media guidance application may retrieve from the bandwidth state database an indication of when access to the second media asset started. The media guidance application may retrieve from a media asset database a value indicating a length or duration of the second media asset. The media guidance application may compute a difference between the current time and the time when access to the second media asset started to determine how much time has elapsed since the second media asset has been accessed. The media guidance application may compare the elapsed accessed time of the second media asset with the duration of the second media asset to determine or estimate how long until access to the second media asset will end.

The media guidance application may search a media asset database for a third media asset that has a remaining duration that corresponds to the estimated length until access to the second media asset ends. The third media asset may be available from a second communications network (e.g., cellular LTE network or cable broadcast network or over-the-air antenna source) different from the first communications network (e.g., on-demand cable network) from which the first media asset was requested to be accessed. The media guidance application may select a third media asset having an attribute that is similar to an attribute of the first on-demand media asset. In some implementations, the third media asset may be a linear media asset that does not consume as much as or any of the available household bandwidth that the first media asset consumes. In some implementations, the third media asset may be a media asset that is accessed through a second communications network (e.g., LTE) that does not consume available household bandwidth of the first communications network. In such circumstances, the third media asset may be a version of the first media asset that is accessible through a different communications network. The media guidance application may perform this search by retrieving metadata indicating one or more attributes of the first media asset and identifying, in the media asset database, a list of candidate media assets that share some or all of the attributes of the first media asset. From the list of candidate media assets, the media guidance application may identify as the third media asset one of the media assets that has a remaining duration that corresponds to the estimated length until access to the second media asset ends. The media guidance application may generate for display a message 510 (FIG. 5) which identifies the third media asset to the user. The user who requested access to the first media asset may access the third media asset while waiting for the bandwidth to become available. Specifically, the user who requested access to the first media asset may access the third media asset until access to the second media asset ends.

The media guidance application can also provide access to display bandwidth speed test. This function and display is very intriguing for the user to actually be able to view the current bandwidth consumption. This test can be used to show (through access from the guide), the actual consumption in real time and as a function of what shows are being "turned on" (viewed) or "turned off" (paused). As a user determines that another user is using the bandwidth (bandwidth hog), it can become increasingly requested that the user wants to see the current bandwidth consumption. The user can load up the speed test, accessed from the guide and then show the "bandwidth hog" how much the speed decreases when the "bandwidth hog" pauses their show.

Display 100 may also include video region 134, advertisement 124, and options region 126. Video region 134 may allow the user to view and/or preview programs that are currently available, will be available, or were available to the user. The content of video region 134 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming or subscription plan), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, language spoken in the household, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting a program and/or channel as a favorite, or purchasing a program, a subtitles setting, or other features. Options available from a main menu display may include search options, VOD options, parental control options, Internet options, cloud-based options, device synchronization options, second screen device options, options to access various types of media guidance data displays, options to subscribe to a premium service, options to view other content while waiting for access to a given content which is consuming household bandwidth to end, options to edit a user's profile, options to access a browse overlay, or other options. The switching of the source from the on-demand to the over-the-air antenna content may alleviate the bandwidth issues for choosing the media asset. In some cases, the use of a cable source as the alternative programming may be problematic if the cable source utilizes the bandwidth to receive cablecast programming. In this case, a physical mechanism may be placed in the user equipment to provide access to over-the-air antenna channels without consuming additional bandwidth through the cable source.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, www-.fan.tv, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. Selection of option 204 may return the user to grid 102 (FIG. 1).

In display 200 listings 206, 208, 210, and 212 may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210 and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
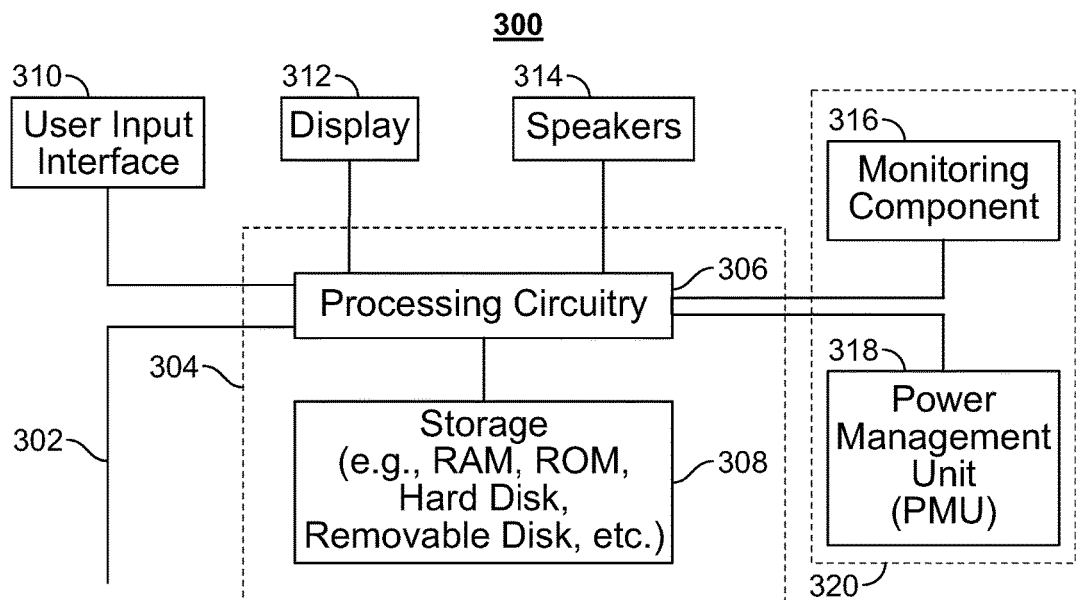
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306, detecting circuitry 320 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry may also instruct detecting circuitry 320, which can be used to detect and/or identify a user or users without requiring the user or users to make any affirmative actions by using any suitable biometric determination technique, such as facial determination, brainwave information, body temperature determination, heart rate determination, odor determination, scent determination, body shape determination, voice determination, language determination, behavioral determination, any other suitable biometric determination technique or any combination thereof.

Detecting circuitry 320 may include monitoring component 316 and power management unit 318. Monitoring component 316 may include one or more components (e.g., an EEG, EMG, pulse oximeter, etc.) for monitoring an activity type (e.g., biometric state, location, or brainwave information) of a user. As referred to herein, "location" refers to any relative or absolute identifier of a position, such as a geographical coordinate, vector for direction, street address, name of building, or any other suitable identifier. For example, a location may be indicated by coordinates in a geographic coordinate system (e.g., latitude or longitude), or a global positioning system (GPS).

It should be noted, monitoring component 316 may, in some embodiments, be located on a separate device in communication with the device upon which a media guidance application (and control circuitry 304) is implemented. For example, in some embodiments, monitoring component 316 may communicate with device 300 via a communications network (e.g., communications network 414 (FIG. 4)). In some embodiments, monitoring component 316 may be a wearable device (e.g., a wristband, headband, watch, etc.).

Using microphones and voice recognition, control circuitry 304 may detect or identify users based on the physical characteristics of their vocal tract through voice recognition, language determination, or voice identification. Using a sound source and an array of microphones, control circuitry 304 may determine information about the shape of the area surrounding the biometric device through acoustic localization, similar to the time-of-flight method described above in reference to IR light. For example, a sound source may be located near an array of microphones. A sound broadcast from the sound source may propagate as a wave front away from the source. As the wave front impacts an object, portions of the wave front may be reflected toward the sound source and array of microphones. Depending on the position of the object, the reflected sound may arrive at the microphone at different times. For example, the reflected sound may arrive at a closer microphone in a shorter amount of time than at a farther microphone. Based on the time or phase difference in arrival time at various microphones, total travel time of the sound, and positions of the microphones, it may be possible to generate a spatial areal map. Locations of objects may be determined based on the spatial areal map generated via acoustic localization, IR time of flight, any other suitable mapping method, or any combination thereof. It should be understood that various biometric techniques and devices may be used alone or in combination to supplement each other to more accurately identify or detect users.

In some embodiments, the media guidance application may respond to verbal commands or verbal input received from a user. Control circuitry 304 may include a voice recognition engine or circuitry with a phoneme encoder to process verbal input from a user. In some implementations, the human language sounds (e.g., utterances) may be received with one or more microphones and provided to the phoneme encoder of control circuitry 304. The phoneme encoder may convert the sounds into machine representations of the sounds using a phoneme representation. In one embodiment, the machine representations may be viewed as American Standard Code for Information Interchange (ASCII) representations of the phonemes, or the like, viewable as a sequence of alpha-numeric values. In one embodiment, the machine representations may employ symbols from the International Phonetic Alphabet (IPA) and/or extended sets adapted for use within a computer device.

As used herein, the term "phoneme" refers to a physical representation of a human language sound or utterance. Moreover, a phoneme is a representation of a sound of a language independent of its position in a word or phrase. Thus, phonemes represent sounds in the most neutral form possible. A variety of written representations of phonemes are known in the art, and, as such, virtually any representation may be used by the present disclosure. For example, in one embodiment, the phonemes may be represented by alpha-numeric symbols such as those employed in the International Phonetic Alphabet (IPA), American Standard Code for Information Interchange (ASCII) format, or the like. However, as noted, the disclosure is not limited to this mechanism, and others may be used. As used herein, the term "word" refers to a single distinct meaningful element of speech or writing that matches one or more phoneme sequences.

Control circuitry 304 may cross-reference a detected phoneme sequence with a database (not shown) that maps each phoneme sequence to a corresponding action. For example, control circuitry 304 may cross-reference a detected phoneme sequence with a database (not shown) to detect that the user spoke a command to select a given media asset.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. For example, storage 308 may be used to store the household bandwidth state database that associates media assets currently being accessed with the amount of bandwidth the assets are consuming. The household bandwidth state database may include multiple entries. Each entry may include a media asset field and corresponding bandwidth consumption, access start time, a play position, and/or duration fields. The bandwidth consumption field may indicate how much bandwidth the associated media asset is consuming, the access start time field may indicate what time or when access to the associated media asset begins, play position field indicates the current play position of the associated media asset, and the duration field indicates a length of the associated media asset. The household bandwidth state database may also include an entry for the household bandwidth state with a field indicating how much bandwidth is currently available in the household. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, microphone, or other user input interfaces. Display 312 may be provided as a stand-alone device or integrated with other elements of user equipment device 300 or can be a projected image. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
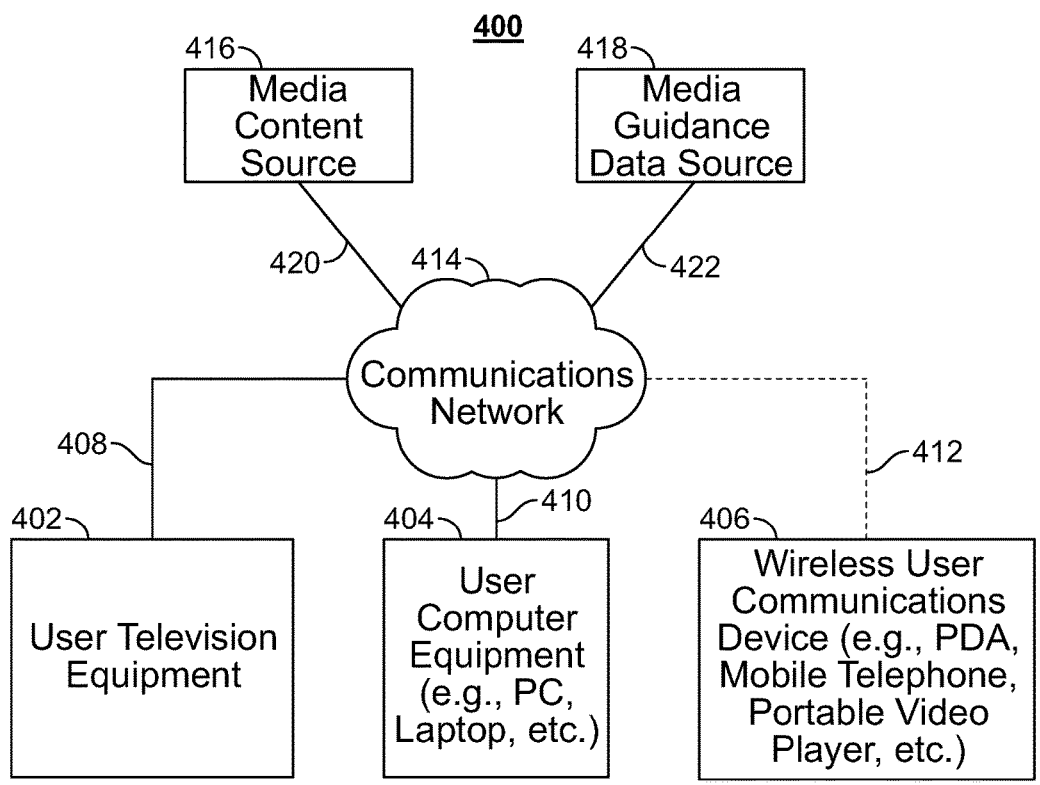
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device (e.g., and may collectively be part of a household) or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device. In some embodiments, the second screen device may provide verbal input to the first device. In some embodiments, the second screen device may be a thin client that cannot perform voice recognition or ASR but simply sends received utterances from a user to the first device. The first device may include the capability to perform ASR on the utterances received with the second screen device. In such cases, the first device may be a local or remote server. In some embodiments, the second screen device may include full capability to perform ASR on a received utterance and may transmit (if necessary) the corresponding language to the first device for further processing.

The user may also set various settings to maintain consistent media guidance application settings across in-home devices and remote devices. Settings include those described herein, as well as channel and program favorites, programming preferences that the guidance application utilizes to make programming recommendations, display preferences, language, and other desirable guidance settings. For example, if a user sets a channel as a favorite on, for example, the web sites www.allrovi.com or www.fan.tv on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G, XLTE, and/or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays and process verbal input.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent Application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 shows an illustrative display screen 500 that may be used to manage available bandwidth in a household in accordance with some embodiments of the disclosure. Screen 500 includes a message 510 that is displayed as a result of managing available bandwidth in a household. For example, as discussed above, message 510 may be presented in response to the media guidance application determining that there is insufficient bandwidth available in the household for accessing a user requested media asset (e.g., an on-demand media asset accessed through the on-demand cable network). In some embodiments, there may be insufficient bandwidth available to access the user requested media asset because a second user (e.g., using a second screen device) is accessing a second media asset (e.g., through the same on-demand cable network).

For example, a first user may request to access a first media asset via an on-demand cable communications network. Specifically, the first user may request to access the show "Family Guy" on-demand. The media guidance application may determine that the minimum bandwidth to access the selected show "Family Guy" is 24 Mbit/s (24 megabits per second). The media guidance application may query a bandwidth state database to determine how much bandwidth is currently available in the household to access a show through the on-demand cable communications network. The database may indicate that the currently available bandwidth in the household is 10 Mbit/s. The media guidance application may determine that 10 Mbit/s currently available in the household is insufficient to access the requested media asset as the requested media asset requires a minimum of 24 Mbit/s. The media guidance application may in response perform a process (discussed below) to identify an alternate media asset to offer the first user to access until there is sufficient bandwidth available in the household to access the first media asset.

In some embodiments, the media guidance application may query the household bandwidth state database to search for a second media asset that is currently being accessed using the on-demand cable communications network. Specifically, the media guidance application may compute how much bandwidth is missing from the currently available bandwidth to enable the first user to access the requested media asset. For example, the media guidance application may compute a difference between the currently available household bandwidth of 10 Mbit/s and the minimum bandwidth required to enable access to the requested media asset of 24 Mbit/s. The media guidance application may determine that 14 Mbit/s are missing from the currently available bandwidth and may search for a second media asset that is currently consuming at least 14 Mbit/s of the household bandwidth. The media guidance application may generate a query to the bandwidth state database for a list of media assets currently being accessed that are consuming at least 14 Mbit/s.

In some embodiments, the media guidance application may process the received list of media assets currently being accessed that are consuming at least 14 Mbit/s to identify the media asset having the shortest time remaining or duration. The identified media asset may be selected as the second media asset. For example, the media guidance application may determine that the second media asset "Jurasic Park" is currently being accessed and is consuming 20 Mbit/s from the household bandwidth. The media guidance application may also determine that a second user who is accessing the second media asset began accessing the media asset 2 hours ago and that the total duration of the media asset is 2.5 hours. Accordingly, the media guidance application may determine or estimate that in 0.5 hours, access to the second media asset will end and will result in 14 Mbit/s being added to or freed up from the currently available household bandwidth. At that time, access to the first media asset will be enabled because enough household bandwidth will be available to satisfy the minimum bandwidth of the first media asset.

In some embodiments, the media guidance application may search a media asset database for a media asset having a minimum remaining duration of 0.5 hours to offer the first user as an alternate media asset. For example, the media guidance application may search a media asset database for all media assets currently available via a different communications network (e.g., a cellular network or broadcast network) than that associated with the first media asset and which have a remaining duration of at least 0.5 hours. In some implementations, the media guidance application may filter the media assets currently available from a different communications to those that match at least one attribute of the first media asset. In some implementations, the media guidance application may select, as the alternate media asset to recommend to the first user, the media asset having the shortest duration of at least 0.5 hours remaining from the rest of media assets having a remaining duration of 0.5 hours. For example, the media guidance application may identify the media asset "Star Wars" that is 1.5 hours long but that has been running for 1 hour. This media asset may be determined to have a remaining duration of 0.5 hours which is the closest duration to that remaining in the second media asset currently consuming the household bandwidth.

The media guidance application may include a number of options in message 510. For example, message 510 may include an option to terminate access to the second media asset 520, an option to access an alternate media asset 530, an option to receive a reminder to access the first media asset 540, and an option to share viewing of the second media asset 530. An exit option 560 may be provided to allow the user to cancel the request and return to the previous screen or media asset.

The option to terminate access to the second media asset 520 may allow the user who is requesting access to the first media asset to terminate the second user's access to the second media asset. Specifically, if access to the second media asset is terminated, the available household bandwidth may increase by a sufficient amount to enable access to the first media asset. In response to receiving a user selection of option 520, the media guidance application may automatically terminate access to the second media asset and begin accessing the requested first media asset. In some implementations, in response to receiving a user selection of option 520, the media guidance application may send a request to the second user to stop accessing the second media asset. The second user may, in response to receiving the request, stop accessing the second media asset. As a result, the available household bandwidth may increase allowing the first user to access the requested first media asset.

The option to access an alternate media asset 530 may allow the first user to access a different media asset from an alternate communications network while waiting for the second user to finish accessing the second media asset. After the second user finishes accessing the second media asset, the media guidance application may automatically present the first media asset to the first user.

In some embodiments, the media guidance application may select the alternate media asset for inclusion in option 530 based on an estimated time remaining in the second media asset being accessed by the second user and based on an estimated duration or time remaining in the alternate media asset. In some implementations, the media guidance application may query the household bandwidth state database to determine when access to the second media asset began and a duration of the second media asset (e.g., how long the second media asset is). In some implementations, the media guidance application may query the household bandwidth state database to determine a current play position of the second user in the second media asset. The media guidance application may compare the current play position or the access start time with the duration of the second media asset. Based on the comparison, the media guidance application may determine a time remaining for the second user to finish accessing the second media asset.

The media guidance application may search a media asset database for a plurality of media assets having a remaining duration equal to or greater than the time remaining for the second user to finish accessing the second media asset. The plurality of media assets may correspond to media assets available for a different communications network (e.g., a non-cable on-demand network such as a cellular network or broadcast network). For example, the media guidance application may search for media assets stored in the media asset database for which a difference between the current time with the scheduled end time of a given one of the media assets is greater than the time remaining in the second media asset.

In some implementations, the media guidance application may limit the search for the plurality of media assets based on an attribute (e.g., content characteristic) of the first media asset requested by the first user. For example, if the first media asset is associated with an action attribute, the media guidance application may search the media asset database for a plurality of media assets associated with the action attribute and for which a difference between the current time with the scheduled end time of a given one of the media assets is greater than the time remaining in the second media asset.

Option to receive a reminder to access the first media asset 540 may allow the user to schedule a reminder to access first media asset 540 when there is sufficient household bandwidth available. For example, the media guidance application, in response to receiving a user selection of option 540, may monitor the available household bandwidth. Specifically, the media guidance application may poll the household state database every predetermined number of seconds, minutes, hours, days, or combination thereof to retrieve the currently available household bandwidth. The media guidance application may compare the retrieved available household bandwidth value every time to the minimum bandwidth value associated with the first media asset. In response to determining that the minimum bandwidth value is less than the retrieved bandwidth value, the media guidance application may trigger a reminder for the first user to access the first media asset. The reminder may be presented to the first user on any device or devices associated with the first user (e.g., a mobile phone or other device the first user is currently using). The reminder may include an option to access the first media asset and an indication that the currently available household bandwidth is sufficient for accessing the first media asset using the communications network represented by the household bandwidth (e.g., the on-demand cable network).

Option to request to share viewing of the second media asset 550 may allow the user to join the second user in viewing or accessing the second media asset being consumed by the second user instead of accessing the first media asset. Specifically, if access to the second media asset is shared, the first user may access a media asset from the same communications network as the second user without decreasing the amount of available household bandwidth. In response to receiving a user selection of option 550, the media guidance application may automatically begin presenting the second media asset to the first user using a device associated with the first user. Specifically, the first user may begin accessing the second media asset from the current play position that the second user is accessing using a first device (e.g., a mobile phone) while the second user accesses the same media asset using a second device (e.g., a tablet). In some implementations, in response to receiving a user selection of option 550, the media guidance application may send a request to the second user to share access to the second media asset. The second user may, in response to receiving the request, enable or prevent shared access to the second media asset. If the second user enables shared access, the media guidance application may present the second media asset to the first user. If the second user prevents shared access, the media guidance application may not present the second media asset to the first user and may instead present a message indicating shared access is unauthorized. The media guidance application may present message 510 as a result of shared access being prevented without including option 550.

In some embodiments, message 510 may be overlaid on top of any of video content 501 or other displays discussed above. For example, message 510 may be presented on top of grid display 100 (FIG. 1) in response to the media guidance application receiving a user selection of a media asset listing (e.g., corresponding to an on-demand media asset).

Figure 6:
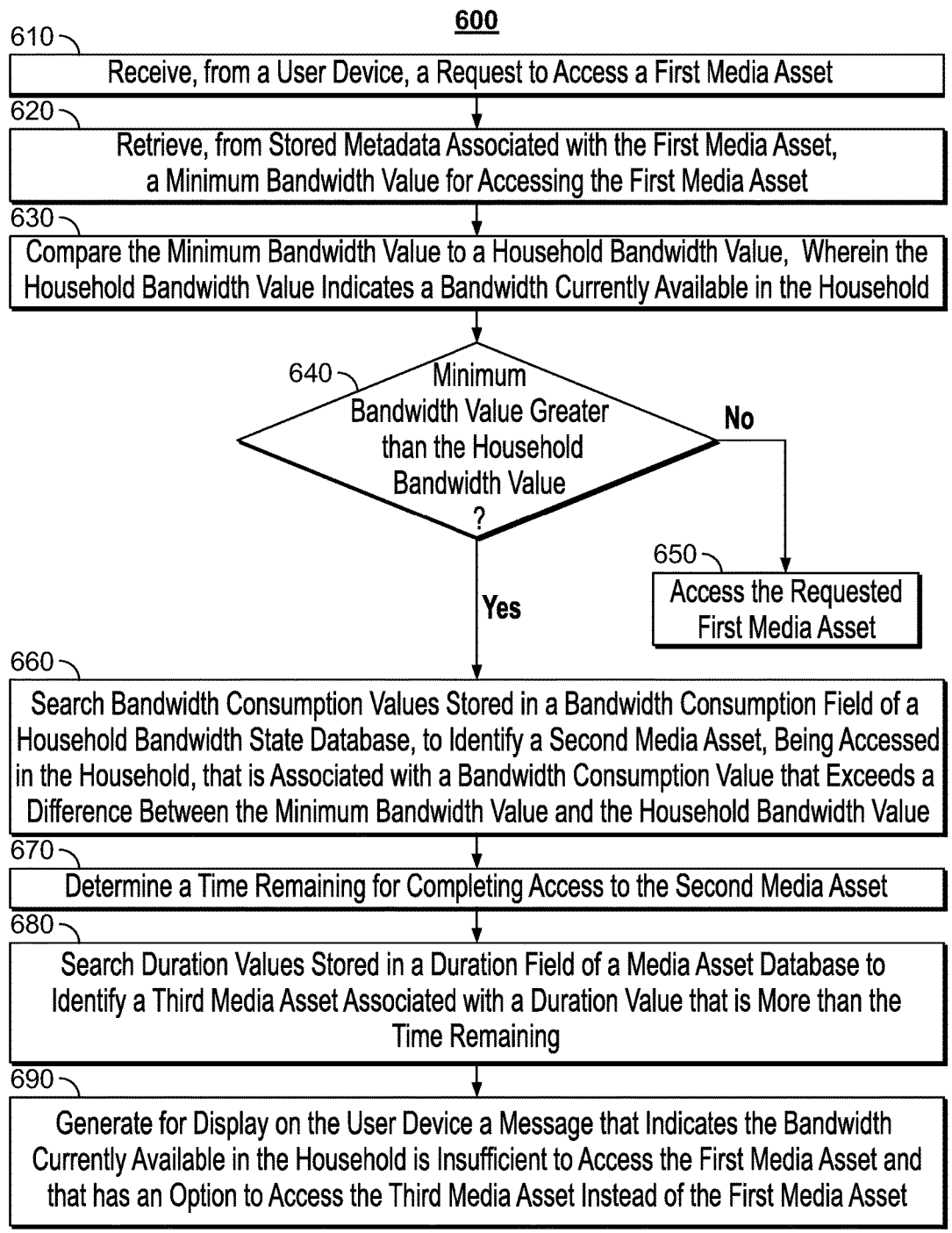

FIG. 6 is a flow diagram of an illustrative process 600 for managing available bandwidth in a household in accordance with some embodiments of the disclosure. At step 610, a request to access a first media asset is received from a user device. For example, the media guidance application may perform process 700 (FIG. 7) to receive the request to access the first media asset. Specifically, the media guidance application may receive a user selection of a listing from grid 102 that corresponds to the first media asset (e.g., a media asset delivered via an on-demand cable communications network).

At step 620, a minimum bandwidth value for accessing the first media asset is retrieved from stored metadata associated with the first media asset. For example, the media guidance application may perform process 800 (FIG. 8) to retrieve the minimum bandwidth value for accessing the first media asset.

At step 630, the minimum bandwidth value is compared to a household bandwidth value, wherein the household bandwidth value indicates a bandwidth currently available in the household. For example, the media guidance application may perform process 900 (FIG. 9) to compare the minimum bandwidth value with the household bandwidth value.

At step 640, a determination is made as to whether the minimum bandwidth value is greater than the household bandwidth value. In response to determining that the minimum bandwidth value is greater than the household bandwidth value, the process proceeds to step 660; otherwise the process proceeds to step 650.

At step 650, the requested first media asset is accessed. For example, the media guidance application may communicate with the source of the first media asset (e.g., the on-demand cable network) to initiate a transmission and receipt of the first media asset with the user device.

At step 660, bandwidth consumption values stored in a bandwidth consumption field of a household bandwidth state database are searched to identify a second media asset, being accessed in the household, that is associated with a bandwidth consumption value that exceeds a difference between the minimum bandwidth value and the household bandwidth value. For example, the media guidance application may perform process 1000 (FIGS. 10A and 10B) to search bandwidth consumption values to identify the second media asset.

At step 670, a time remaining for completing access to the second media asset is determined. For example, the media guidance application may perform process 1100 (FIG. 11) to determine a time remaining for completing access to the second media asset. Specifically, by performing process 1100, the media guidance application may determine or estimate how long until the second user completes or finishes accessing the second media asset.

At step 680, duration values stored in a duration field of a media asset database are searched to identify a third media asset associated with a duration value that is more than the time remaining. For example, the media guidance application may perform process 1200 (FIG. 12) to search duration values to identify a third media asset. Specifically, by performing process 1200, the media guidance application may search for an alternate media asset the user can access instead of the first media asset. In some embodiments, the media assets searched for using process 1200 may be limited to media assets available via a different communications network (e.g., a cellular network) than the communications network of the first media asset. The alternate media asset may have a remaining duration that is greater than or equal to the remaining duration of the second media asset. In some implementations, the alternate media asset may be selected from a plurality based on an attribute or characteristic of the first media asset. For example, if the user requested an action movie that requires more bandwidth than is currently available in the household, the media guidance application may search for another action movie from another communications network, as the alternate media asset, which has more time left than the second media asset.

At step 690, a message that indicates the bandwidth currently available in the household is insufficient to access the first media asset and that has an option to access the third media asset instead of the first media asset is generated for display on the user device. For example, the media guidance application may present message 510 (FIG. 5) to the user who requested the first media asset.

Figure 7:
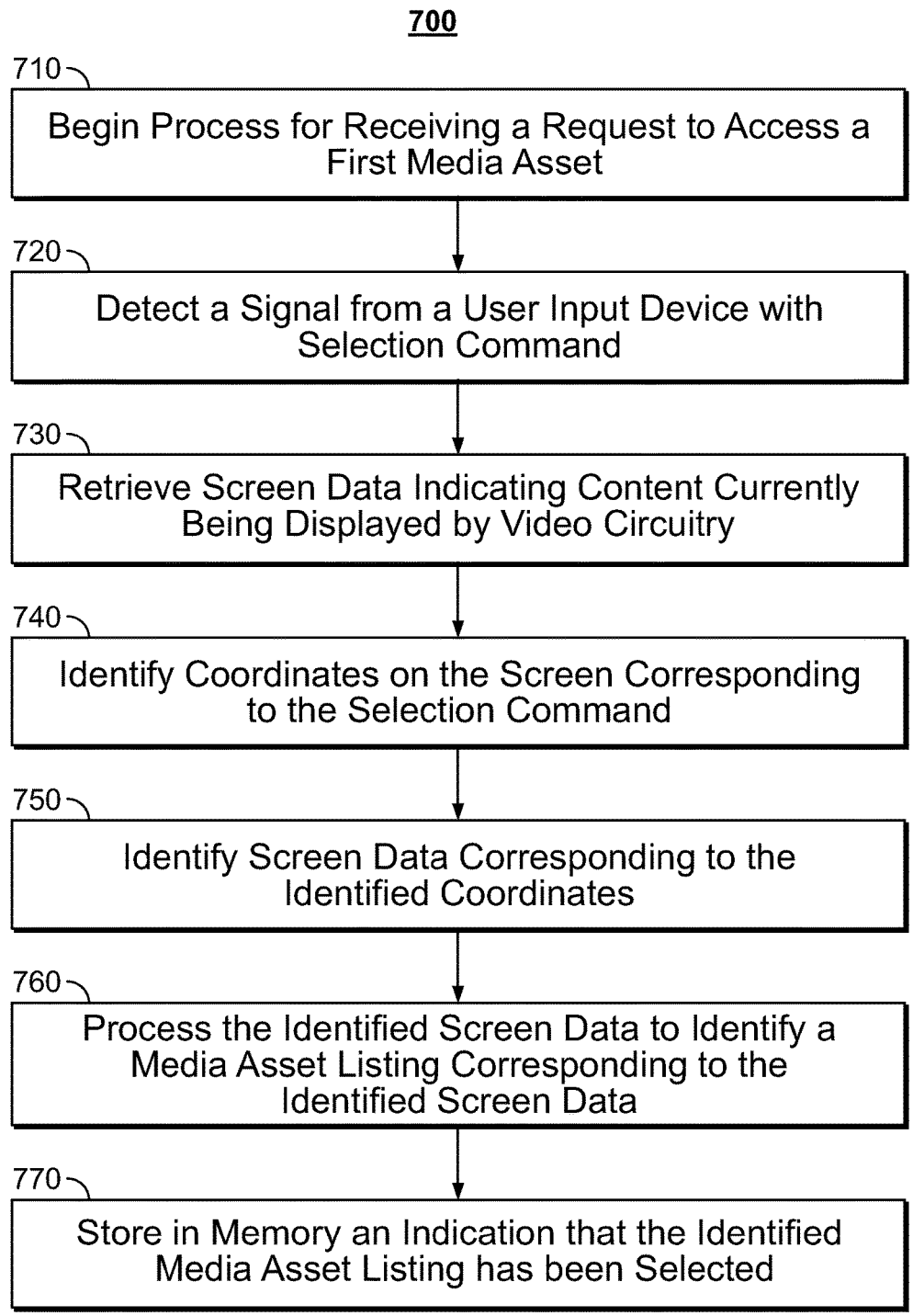

FIG. 7 is a flow diagram of an illustrative process 700 for receiving a request to access a first media asset in accordance with some embodiments of the disclosure. At step 710, the process for receiving a request to access a first media asset begins.

At step 720, a signal from a user input device with a selection command is detected. For example, the media guidance application may receive a signal indicating the user pressed a SELECT button on a remote control or that the user tapped on a touch screen display at a particular position.

At step 730, screen data indicating content currently being displayed by video circuitry is retrieved. For example, the media guidance application may retrieve data representing grid 102 and where on grid 102 a cursor is currently positioned.

At step 740, coordinates on the screen corresponding to the selection command are identified. For example, the media guidance application may identify the coordinates of a cursor on the screen and/or the location where the user tapped on the touchscreen.

At step 750, screen data corresponding to the identified coordinates is identified. For example, the media guidance application may process the retrieved screen data to identify what cell of grid 102 is positioned at the identified coordinates (e.g., where the cursor was positioned or where the user tapped on the screen).

At step 760, the identified screen data is processed to identify a media asset listing corresponding to the identified screen data. For example, the media guidance application may retrieve the name of the program listing that is in the identified cell of grid 102.

At step 770, an indication that the identified media asset listing has been selected is stored in memory.

FIG. 8 is a flow diagram of an illustrative process 800 for retrieving, from stored metadata associated with the first media asset, a minimum bandwidth value for accessing the first media asset in accordance with some embodiments of the disclosure. At step 810, the process for retrieving, from stored metadata associated with the first media asset, a minimum bandwidth value for accessing the first media asset begins.

At step 820, a query for a media listings database that includes an identifier of the first media asset is generated.

At step 830, the generated query is transmitted to the media listings database. The media listings database may be referred to as the media asset database interchangeably.

At step 840, a data structure is received from the media listings database that includes multiple fields of information for the first media asset. The fields of information may include a minimum access bandwidth field, a title field, a duration field, an attributes field, a description field, a content source field, and/or a communications network field.

At step 850, one of the multiple fields that represents minimum access bandwidth is identified.

At step 860, data indicating the minimum access bandwidth is retrieved from the identified field of the received data structure.

At step 870, the retrieved data indicating the minimum access bandwidth is stored as the minimum bandwidth value in memory.

Figure 9:
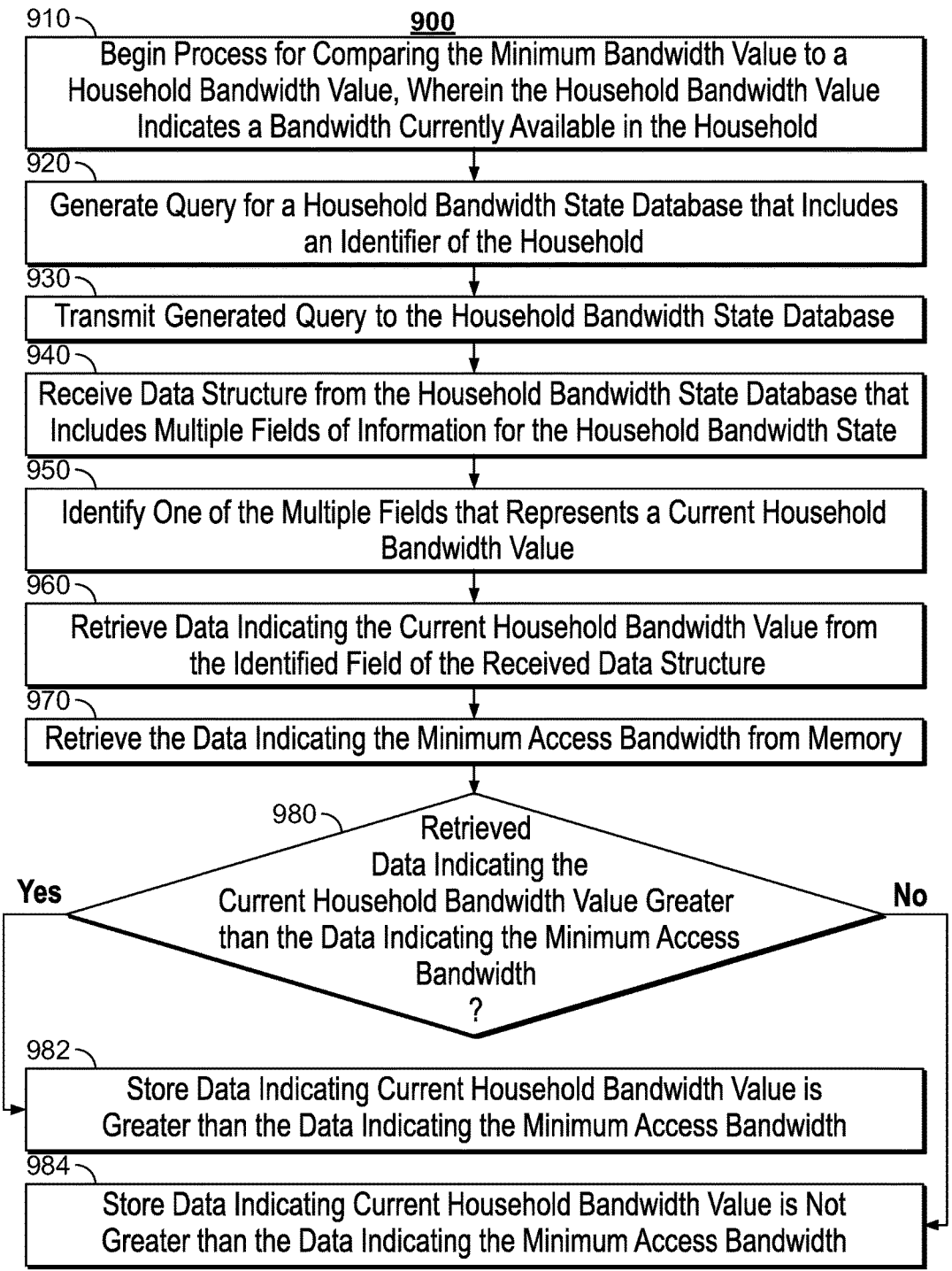

FIG. 9 is a flow diagram of an illustrative process 900 for comparing the minimum bandwidth value to a household bandwidth value, wherein the household bandwidth value indicates a bandwidth currently available in the household in accordance with some embodiments of the disclosure. At step 910, the process for comparing the minimum bandwidth value to a household bandwidth value, wherein the household bandwidth value indicates a bandwidth currently available in the household, begins.

At step 920, a query for a household bandwidth state database that includes an identifier of the household is generated.

At step 930, the generated query is transmitted to the household bandwidth state database.

At step 940, a data structure is received from the household bandwidth state database that includes multiple fields of information for the household bandwidth state.

At step 950, one of the multiple fields that represents a current household bandwidth value is identified.

At step 960, data indicating the current household bandwidth value is retrieved from the identified field of the received data structure.

At step 970, the data indicating the minimum access bandwidth is retrieved from memory.

At step 980, a determination is made as to whether the retrieved data indicating the current household bandwidth value is greater than the data indicating the minimum access bandwidth. In response to determining that the retrieved data indicating the current household bandwidth value is greater than the data indicating the minimum access bandwidth, the process proceeds to step 982, otherwise, the process proceeds to step 984.

At step 982, data indicating current household bandwidth value is greater than the data indicating the minimum access bandwidth is stored.

At step 984, data indicating current household bandwidth value is not greater than the data indicating the minimum access bandwidth is stored.

Figure 10A:
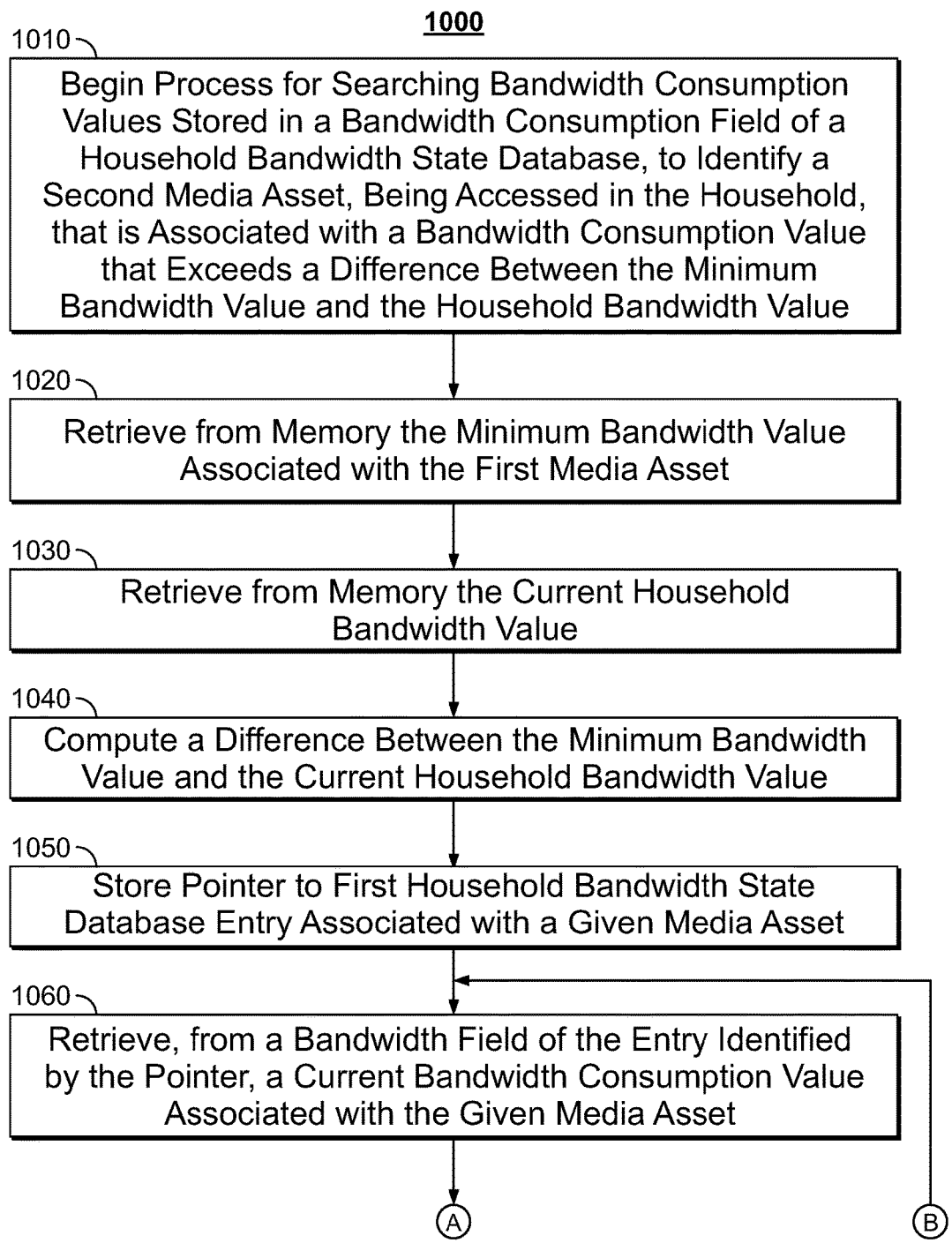
Figure 10B:
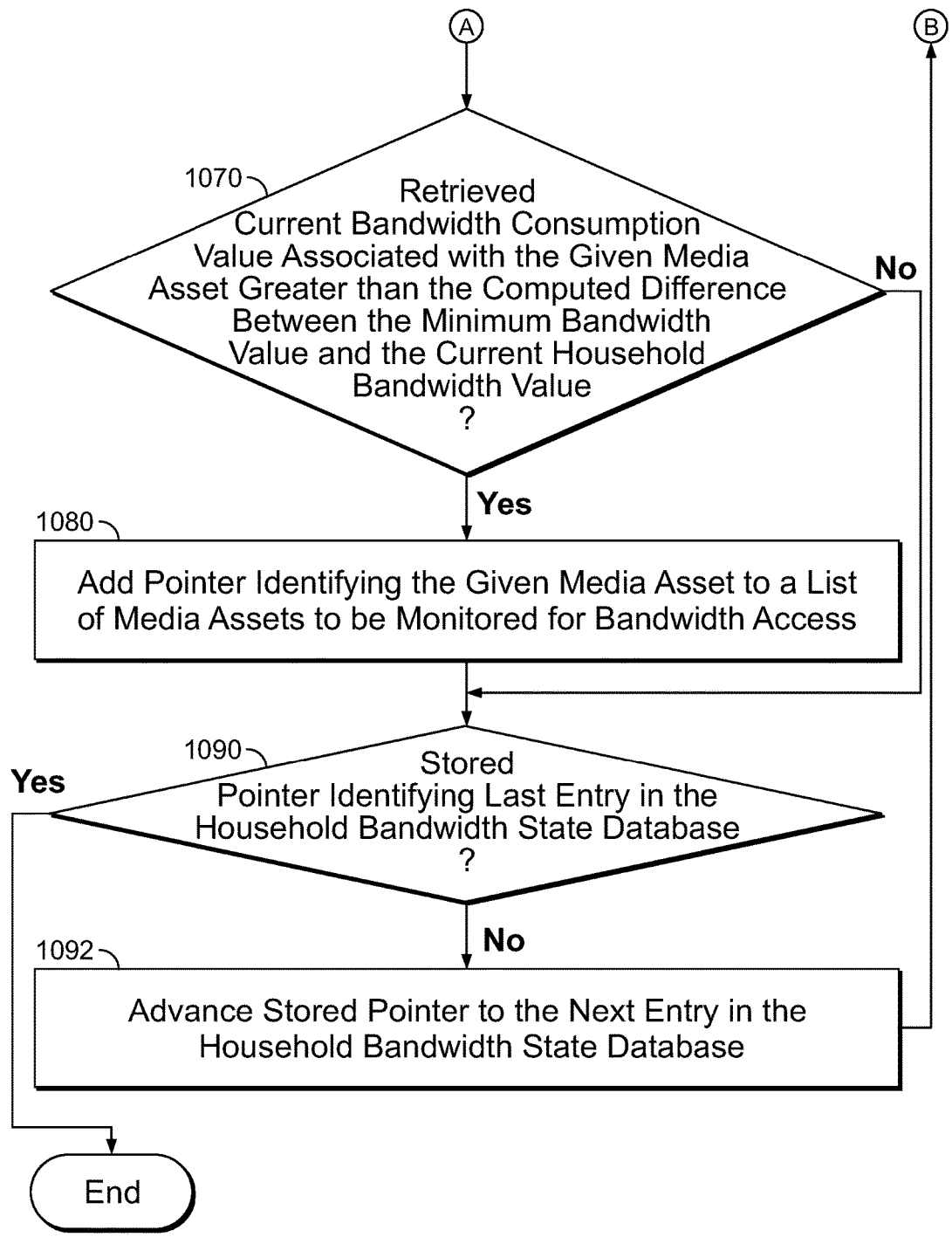

FIGS. 10A and 10B are a flow diagram of an illustrative process 1000 for searching bandwidth consumption values stored in a bandwidth consumption field of a household bandwidth state database, to identify a second media asset, being accessed in the household, that is associated with a bandwidth consumption value that exceeds a difference between the minimum bandwidth value and the household bandwidth value in accordance with some embodiments of the disclosure. At step 1010, the process for searching bandwidth consumption values stored in a bandwidth consumption field of a household bandwidth state database, to identify a second media asset, currently being accessed in the household, that is associated with a bandwidth consumption value that exceeds a difference between the minimum bandwidth value and the household bandwidth value, begins.

At step 1020, the minimum bandwidth value associated with the first media asset is retrieved from memory.

At step 1030, the current household bandwidth value is retrieved from memory.

At step 1040, a difference between the minimum bandwidth value and the current household bandwidth value is computed.

At step 1050, a pointer to a first household bandwidth state database entry associated with a given media asset is stored.

At step 1060, a current bandwidth consumption value associated with the given media asset is retrieved from a bandwidth field of the entry identified by the pointer.

At step 1070, a determination is made as to whether the retrieved current bandwidth consumption value associated with the given media asset is greater than the computed difference between the minimum bandwidth value and the current household bandwidth value. In response to determining that the retrieved current bandwidth consumption value associated with the given media asset is greater than the computed difference, the process proceeds to step 1080, otherwise the process proceeds to step 1090.

At step 1080, a pointer identifying the given media asset is added to a list of media assets to be monitored for bandwidth access.

At step 1090, a determination is made as to whether the stored pointer is identifying the last entry in the household bandwidth state database. In response to determining that the stored pointer is identifying the last entry, the process ends, otherwise the process proceeds to step 1092.

At step 1092, the stored pointer is advanced to the next entry in the household bandwidth state database.

Figure 11:
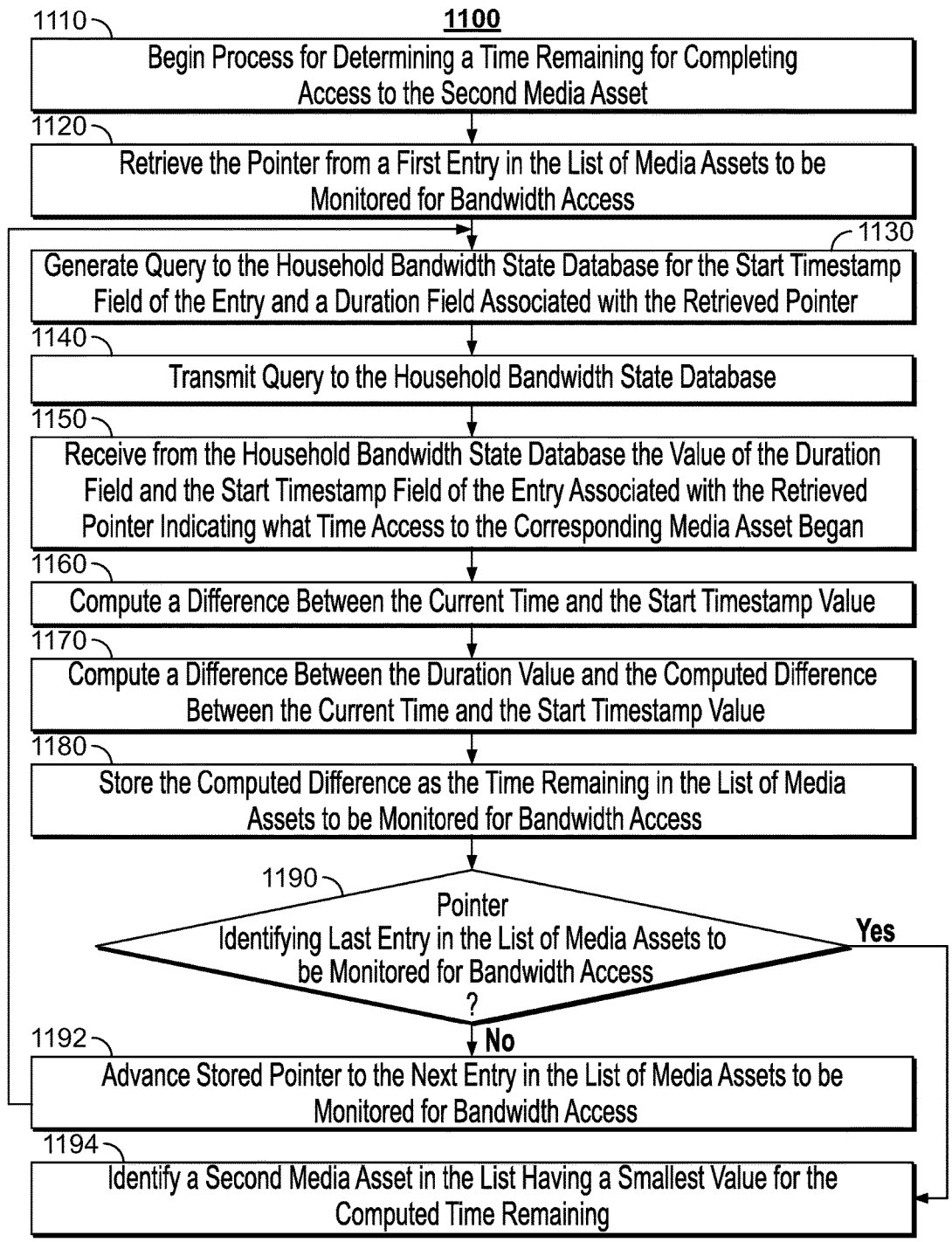

FIG. 11 is a flow diagram of an illustrative process 1100 for determining a time remaining for completing access to the second media asset in accordance with some embodiments of the disclosure. At step 1110, the process for determining a time remaining for completing access to the second media asset begins.

At step 1120, the pointer is retrieved from a first entry in the list of media assets to be monitored for bandwidth access.

At step 1130, a query to the household bandwidth state database for the start timestamp field of the entry and a duration field associated with the retrieved pointer is generated.

At step 1140, the query is transmitted to the household bandwidth state database.

At step 1150, the value of the duration field and the start timestamp field of the entry associated with the retrieved pointer indicating what time access to the corresponding media asset began is received from the household bandwidth state database.

At step 1160, a difference between the current time and the start timestamp value is computed.

At step 1170, a difference between the duration value and the computed difference between the current time and the start timestamp value is computed.

At step 1180, the computed difference is stored as the time remaining in the list of media assets to be monitored for bandwidth access.

At step 1190, a determination is made as to whether the pointer is identifying the last entry in the list of media assets to be monitored for bandwidth access. In response to determining that the pointer is identifying the last entry, the process proceeds to step 1194, otherwise the process proceeds to step 1192.

At step 1192, the stored pointer is advanced to the next entry in the list of media assets to be monitored for bandwidth access.

At step 1194, a second media asset in the list having a smallest value for the computed time remaining is identified.

Figure 12:
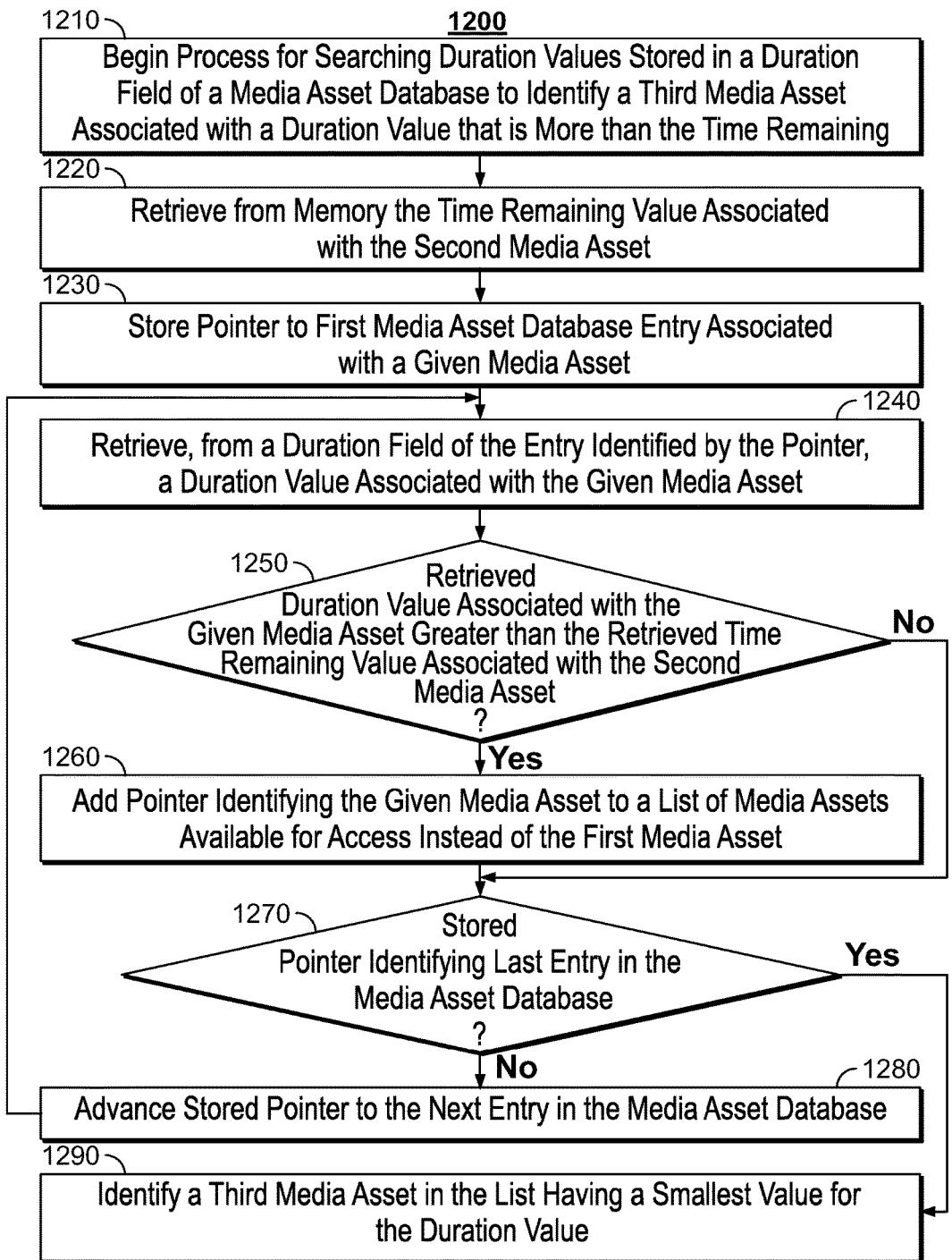

FIG. 12 is a flow diagram of an illustrative process 1200 for searching duration values stored in a duration field of a media asset database to identify a third media asset associated with a duration value that is more than the time remaining in accordance with some embodiments of the disclosure. At step 1210, the process for searching duration values stored in a duration field of a media asset database to identify a third media asset associated with a duration value that is more than the time remaining begins.

At step 1220, the time remaining value associated with the second media asset is retrieved from memory.

At step 1230, a pointer to the first media asset database entry associated with a given media asset is stored.

At step 1240, a duration value associated with the given media asset is retrieved from a duration field of the entry identified by the pointer.

At step 1250, a determination is made as to whether the retrieved duration value associated with the given media asset is greater than the retrieved time remaining value associated with the second media asset. In response to determining that the retrieved duration value associated with the given media asset is greater than the retrieved time remaining value, the process proceeds to step 1260, otherwise the process proceeds to step 1270.

At step 1260, a pointer identifying the given media asset is added to a list of media assets available for access instead of the first media asset.

At step 1270, a determination is made as to whether the stored pointer is identifying the last entry in the media asset database. In response to determining that the pointer is identifying the last entry, the process proceeds to step 1290, otherwise the process proceeds to step 1280.

At step 1280, the stored pointer is advanced to the next entry in the media asset database.

At step 1290, a third media asset in the list having a smallest value for the duration value is identified.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. Furthermore, as referred herein, the term "in response to" means initiated as a result of. For example, a first action being performed in response to another action may include interstitial steps between the first action and the second action. As referred herein, the term "directly in response to" means caused by. For example, a first action being performed directly in response to another action may not include interstitial steps between the first action and the second action. In addition, the systems and methods described herein may be performed in real time. It should also be noted, the systems and/or methods described above may be applied to, or used in accordance with, other systems and/or methods.

What is claimed is:

1. A method for managing available bandwidth in a household, the method comprising:
receiving, from a user device, a request to stream a first media asset;
retrieving, from stored metadata associated with the first media asset, a minimum bandwidth value for streaming the first media asset;
comparing the minimum bandwidth value to a household bandwidth value in a household bandwidth state database, wherein the household bandwidth value indicates a bandwidth currently available in the household;
in response to determining that the minimum bandwidth value is greater than the household bandwidth value, identifying a stream of a second media asset that is consuming bandwidth in the household;
determining a time remaining for completing the stream of the second media asset;
comparing a duration value of a third media asset in a media asset database with the time remaining, wherein the third media asset has an associated bandwidth value less than the household bandwidth value; and
in response to determining that the duration value of the third media asset is greater than the time remaining, generating for display on the user device a message that indicates the bandwidth currently available in the household is insufficient to stream the first media asset and that has an option to stream the third media asset instead of the first media asset.

2. The method of claim 1 further comprising:
receiving a user selection of a quality associated with the first media asset; and
processing the stored metadata to identify the minimum bandwidth value that is associated with the selected quality.

3. The method of claim 1, wherein the message includes an option to enable shared the second media asset.

4. The method of claim 1 further comprising:
storing an initial value for the household bandwidth value in the household bandwidth state database;
receiving a request to stream the second media asset before receiving the request to stream the first media asset;
retrieving, from stored metadata associated with the second media asset, a minimum bandwidth value for streaming the second media asset;

storing the minimum bandwidth value for streaming the second media asset in a bandwidth consumption field of the household bandwidth state database associated with the second media asset; and decrementing the initial value for the household bandwidth value by the minimum bandwidth value for streaming the second media asset.

5. The method of claim 1, wherein the bandwidth available in the household is associated with a first network, and wherein the message includes at least one of an option to stream the first media asset from a second network and an option to access email.

6. The method of claim 1, wherein determining the time remaining comprises:

retrieving from the household bandwidth state database a current play position of the second media asset; and computing a difference between a duration of the second media asset and the current play position to determine the time remaining.

7. The method of claim 1, further comprising searching duration values stored in a duration field of the media asset database for the duration value of the third media asset, wherein the duration value of the third media asset represents how much time remains in the third media asset.

8. The method of claim 7, wherein searching the duration values comprises:

identifying an attribute of the first media asset;

searching attributes stored in an attribute field of the media asset database to identify a list of media assets associated with an attribute corresponding to the identified attribute of the first media asset; and searching the duration values stored in the media asset database for the list of media assets.

9. The method of claim 1, wherein the message includes an option to terminate streaming the second media asset in order to enable streaming the first media asset.

10. The method of claim 1, wherein identifying the stream of the second media asset that is consuming bandwidth in the household further comprises:

searching bandwidth consumption values stored in the household bandwidth state database; and determining that the second media asset is associated with a bandwidth consumption value that exceeds a difference between the minimum bandwidth value and the household bandwidth value.

11. A system for managing available bandwidth in a household, the system comprising:

a storage device for storing a household bandwidth state database and a media asset database, wherein the storage device is accessible to the user device;

control circuitry of a user device configured to:

receive, from the input interface circuitry, a request to stream a first media asset;

retrieve, from stored metadata associated with the first media asset, a minimum bandwidth value for streaming the first media asset;

compare the minimum bandwidth value to a household bandwidth value in a household bandwidth state database, wherein the household bandwidth value indicates a bandwidth currently available in the household;

in response to determining that the minimum bandwidth value is greater than the household bandwidth value, identify a stream of a second media asset that is consuming bandwidth in the household;

determine a time remaining for completing the stream of the second media asset;

compare a duration value of a third media asset in a media asset database with is more than the time remaining, wherein the third media asset has an associated bandwidth value less than the household bandwidth value; and in response to determining that the duration value of the third media asset is greater than the time remaining, generate for display on the user device a message that indicates the bandwidth currently available in the household is insufficient to stream the first media asset and that has an option to stream the third media asset instead of the first media asset.

12. The system of claim 11, wherein the control circuitry of the user device is configured to:

receive a user selection of a quality associated with the first media asset; and process the stored metadata to identify the minimum bandwidth value that is associated with the selected quality.

13. The system of claim 11, wherein the message includes an option to enable shared the second media asset.

14. The system of claim 11 further comprising the control circuitry of the user device configured to:

store an initial value for the household bandwidth value in the household bandwidth state database;

receive a request to stream the second media asset before receiving the request to stream the first media asset;

retrieve, from stored metadata associated with the second media asset, a minimum bandwidth value for streaming the second media asset;

store the minimum bandwidth value for streaming the second media asset in the bandwidth consumption field of the household bandwidth state database associated with the second media asset; and decrement the initial value for the household bandwidth value by the minimum bandwidth value for streaming the second media asset.

15. The system of claim 11, wherein the bandwidth available in the household is associated with a first network, and wherein the message includes at least one of an option to stream the first media asset from a second network and an option to access email.

16. The system of claim 11, wherein the control circuitry of the user device is configured to determine the time remaining by:

retrieving from the household bandwidth state database a current play position of the second media asset; and computing a difference between a duration of the second media asset and the current play position to determine the time remaining.

17. The system of claim 11, wherein the control circuitry is further configured to:

search duration values stored in a duration field of the media asset database for the duration value of the third media asset, wherein the duration value of the third media asset represents how much time remains in the third media asset.

18. The system of claim 17, wherein the control circuitry of the user device is configured to search the duration values by:

identifying an attribute of the first media asset;

searching attributes stored in an attribute field of the media asset database to identify a list of media assets associated with an attribute corresponding to the identified attribute of the first media asset; and searching the duration values stored in the media asset database for the list of media assets.

19. The system of claim 11, wherein the message includes an option to terminate streaming the second media asset in order to enable streaming the first media asset.

20. The system of claim 11, wherein the control circuitry of the user device identifies the stream of the second media asset that is consuming bandwidth in the household by:
   searching bandwidth consumption values stored in the household bandwidth state database; and
   determining that the second media asset is associated with a bandwidth consumption value that exceeds a difference between the minimum bandwidth value and the household bandwidth value.

\* \* \* \* \*

UNITED STATES PATENT AND TRADEMARK OFFICE
CERTIFICATE OF CORRECTION

PATENT NO. : 10,171,853 B2
APPLICATION NO. : 15/707580
DATED : January 1, 2019
INVENTOR(S) : Claire M. Wallters et al.

Page 1 of 1

It is certified that error appears in the above-identified patent and that said Letters Patent is hereby corrected as shown below:

In the Claims

At Column 30, Claim 3, Line 58, please insert --access to-- after "enable shared".

At Column 32, Claim 11, Line 2, please remove "is more than".

At Column 32, Claim 13, Line 21, please insert --access to-- after "enable shared".

Signed and Sealed this
Ninth Day of April, 2019

Andrei Iancu
*Director of the United States Patent and Trademark Office*